US010973075B2

(12) United States Patent
Sheik et al.

(10) Patent No.: US 10,973,075 B2
(45) Date of Patent: Apr. 6, 2021

(54) COMMON CHANNEL CONFIGURATION IN NEW RADIO INACTIVE STATE

(71) Applicant: QUALCOMM Incorporated, San Diego, CA (US)

(72) Inventors: Ansah Ahmed Sheik, Hyderabad (IN); Ozcan Ozturk, San Diego, CA (US); Daniel Amerga, San Diego, CA (US); Sindhu Satyan, San Diego, CA (US); Sundaresan Tambaram Kailasam, San Diego, CA (US); Yongsheng Shi, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/683,801

(22) Filed: Nov. 14, 2019

(65) Prior Publication Data
US 2020/0163150 A1    May 21, 2020

(30) Foreign Application Priority Data
Nov. 16, 2018 (IN) .............................. 201841043203

(51) Int. Cl.
*H04W 4/00*    (2018.01)
*H04W 76/27*   (2018.01)
(Continued)

(52) U.S. Cl.
CPC ........... *H04W 76/27* (2018.02); *H04W 36/08* (2013.01); *H04W 36/305* (2018.08);
(Continued)

(58) Field of Classification Search
CPC .......................... H04W 76/27; H04W 36/0033
See application file for complete search history.

(56) References Cited

U.S. PATENT DOCUMENTS

2015/0381431 A1* 12/2015 Jung .................. H04L 41/0816
                                                        370/329
2018/0139778 A1*  5/2018 Chou .................... H04W 76/27
2020/0045674 A1*  2/2020 Tseng .................... H04W 76/19

OTHER PUBLICATIONS

"3rd Generattion Partnership Project; Technical Specification Group Radio Access Network, NR, Radio Resource Control (RRC) Protocol Specification (Release 15)," 3GPP Draft, UPDATEL1RFCAOABILITY_38331F30_V7, 3rd Generation Partnership Project (3GPP), Mobile Competence Centre, 650, Route Des Lucioles, F-06921, Sophia-Antipois Cedex, France, Nov. 13, 2018 (Nov. 13, 2018), XP051477870, 451 pages, Retrieved from the Internet: URL: http://www.3gpp.org/ftp/Email%5FDiscussions/RAN2/[103bis%2322][NR]%20UE%20capabilities [retrieved on Nov. 13, 2018].

(Continued)

Primary Examiner — Omoniyi Obayanju
(74) Attorney, Agent, or Firm — Harrity & Harrity, LLP

(57) ABSTRACT

Various aspects of the present disclosure generally relate to wireless communication. In some aspects, a user equipment may receive a radio resource control (RRC) resume message, associated with transitioning the UE from an inactive state to a connected state. The UE may configure, based at least in part on receiving the RRC resume message, the UE with a serving cell common configuration, associated with a serving cell of the UE, received in a system information block (SIB) associated with the serving cell. Numerous other aspects are provided.

30 Claims, 8 Drawing Sheets

(51) Int. Cl.
*H04W 76/19* (2018.01)
*H04W 76/28* (2018.01)
*H04W 76/11* (2018.01)
*H04W 88/08* (2009.01)
*H04W 36/30* (2009.01)
*H04W 74/00* (2009.01)
*H04W 72/14* (2009.01)
*H04W 88/02* (2009.01)
*H04W 36/08* (2009.01)

(52) U.S. Cl.
CPC ......... *H04W 72/14* (2013.01); *H04W 74/006* (2013.01); *H04W 76/11* (2018.02); *H04W 76/19* (2018.02); *H04W 76/28* (2018.02); *H04W 88/023* (2013.01); *H04W 88/08* (2013.01)

(56) References Cited

OTHER PUBLICATIONS

International Search Report and Written Opinion—PCT/US2019/061713—ISA/EPO—dated Feb. 21, 2020.

\* cited by examiner

COMMON CHANNEL CONFIGURATION IN NEW RADIO INACTIVE STATE

CROSS REFERENCE TO RELATED APPLICATION

This application claims priority to Indian Application No. 201841043203, filed on Nov. 16, 2018, entitled "COMMON CHANNEL CONFIGURATION IN NEW RADIO INACTIVE STATE," which is hereby expressly incorporated by reference herein.

FIELD OF THE DISCLOSURE

Aspects of the present disclosure generally relate to wireless communication, and to techniques and apparatuses for common channel configuration in New Radio (NR) inactive state.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a radio resource control (RRC) resume message, associated with transitioning the UE from an inactive state to a connected state; and configuring, based at least in part on receiving the RRC resume message, the UE with a serving cell common configuration, associated with a serving cell of the UE, received in a system information block (SIB) associated with the serving cell.

In some aspects, a UE for wireless communication may include memory and one or more processors coupled to the memory. The memory and the one or more processors may be configured to receive a RRC resume message, associated with transitioning the UE from an inactive state to a connected state; and configure, based at least in part on receiving the RRC resume message, the UE with a serving cell common configuration, associated with a serving cell of the UE, received in a SIB associated with the serving cell.

In some aspects, a non-transitory computer-readable medium may store one or more instructions for wireless communication. The one or more instructions, when executed by one or more processors of a UE, may cause the one or more processors to receive a RRC resume message, associated with transitioning the UE from an inactive state to a connected state; and configure, based at least in part on receiving the RRC resume message, the UE with a serving cell common configuration, associated with a serving cell of the UE, received in a SIB associated with the serving cell.

In some aspects, an apparatus for wireless communication may include means for receiving a RRC resume message, associated with transitioning the apparatus from an inactive state to a connected state; and means for configuring, based at least in part on receiving the RRC resume message, the apparatus with a serving cell common configuration, associated with a serving cell of the apparatus, received in a SIB associated with the serving cell.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It should be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
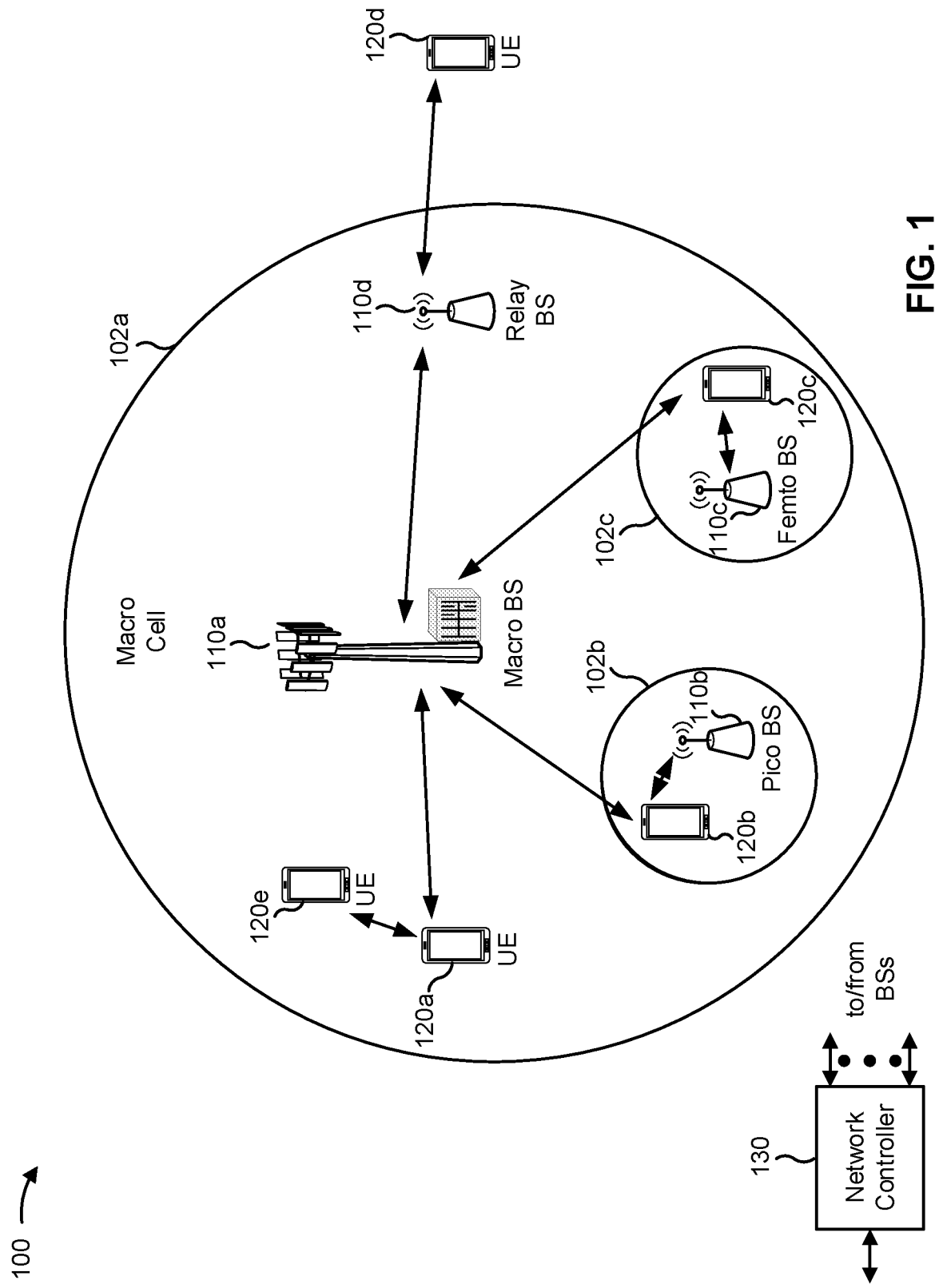
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
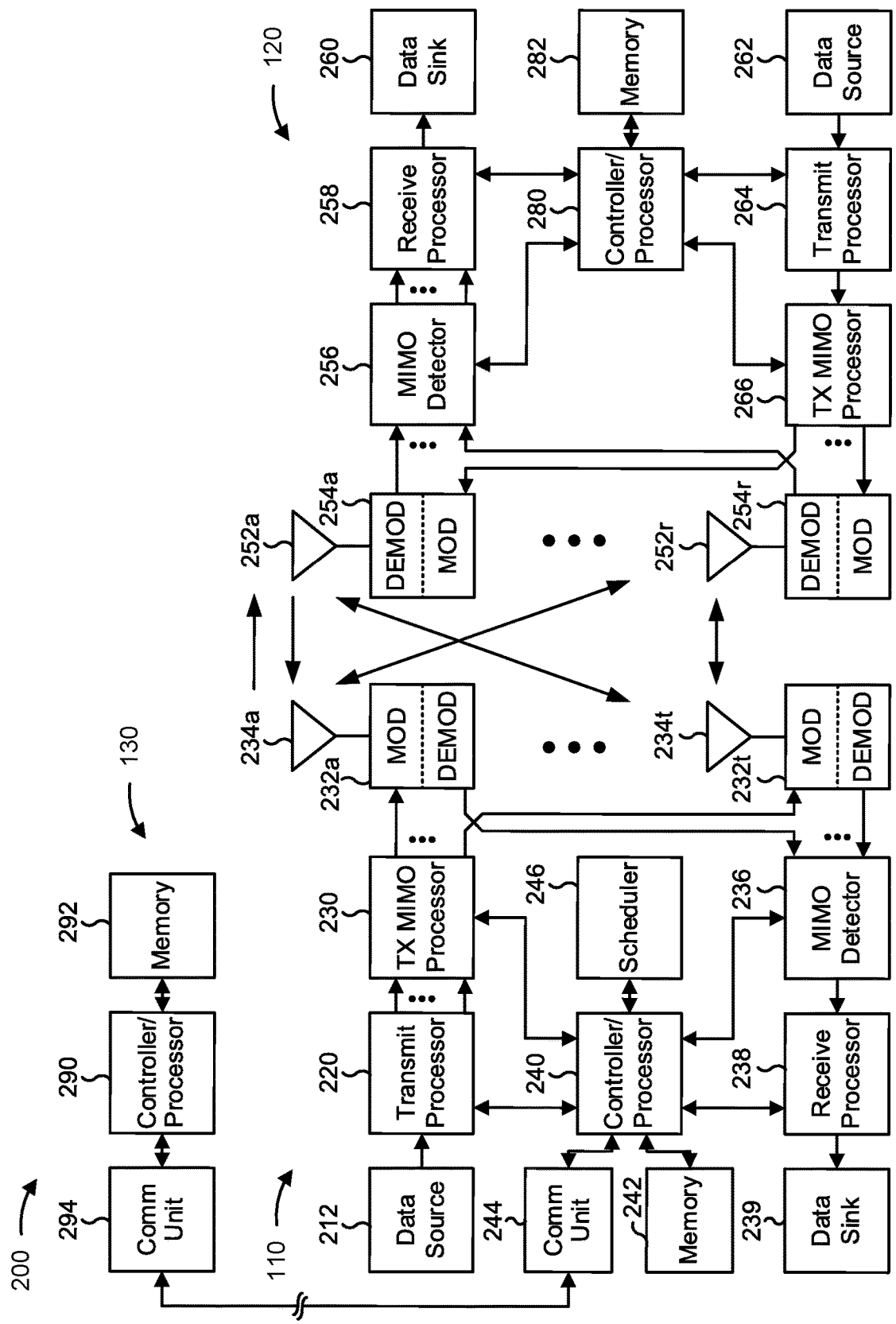
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with common channel configuration in NR inactive state, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving a RRC resume message, associated with transitioning UE 120 from an inactive state to a connected state; means for configuring, based at least in part on receiving the RRC resume message, UE 120 with a serving cell common configuration, associated with a serving cell of UE 120, received in a SIB associated with the serving cell; and/or the like. In some aspects, such means may include one or more components of UE 120 described in connection with FIG. 2.

As indicated above, FIG. 2 is provided merely as an example. Other examples may differ from what is described with regard to FIG. 2.

Figure 3A:
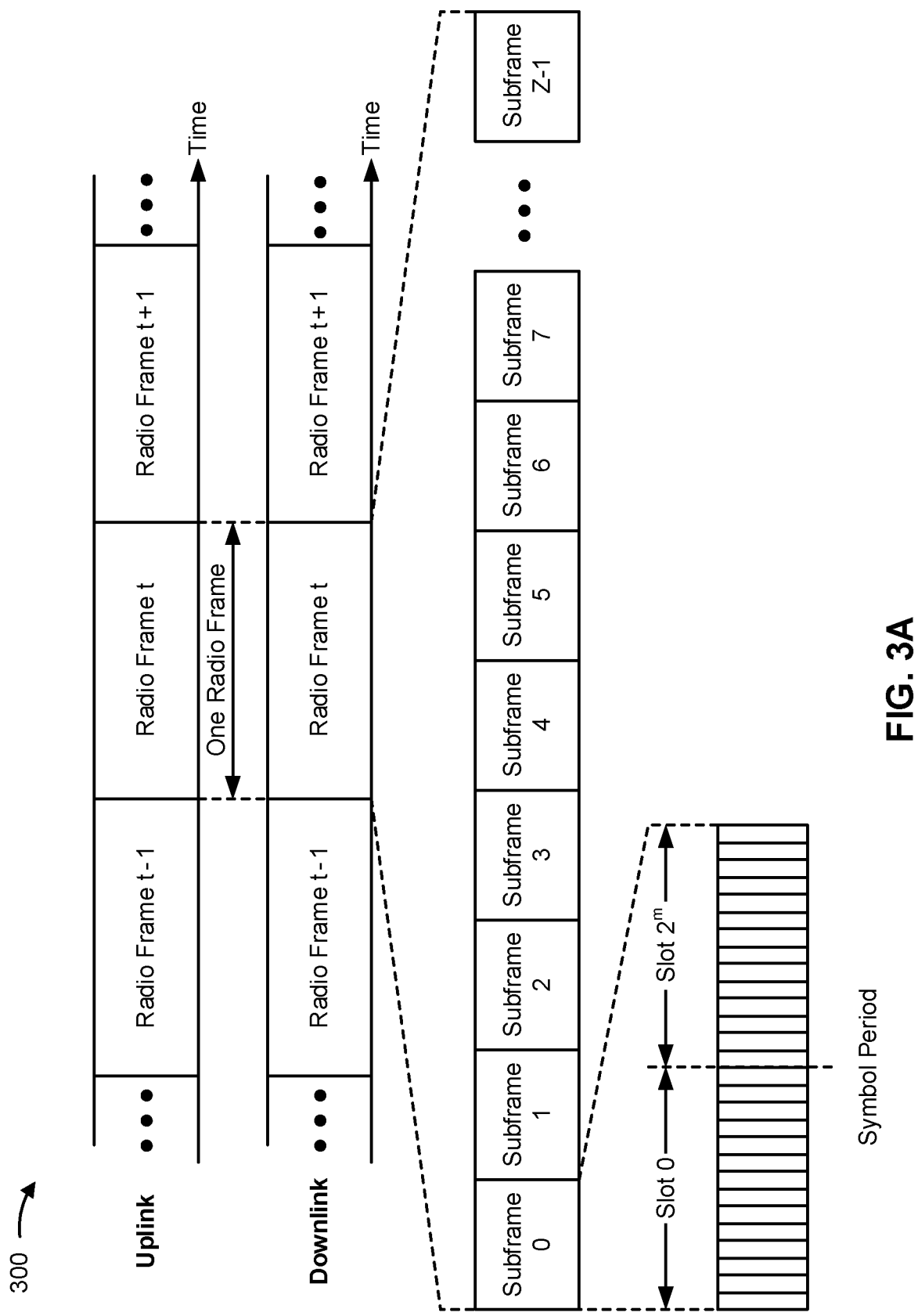
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z-1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, a slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L-1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
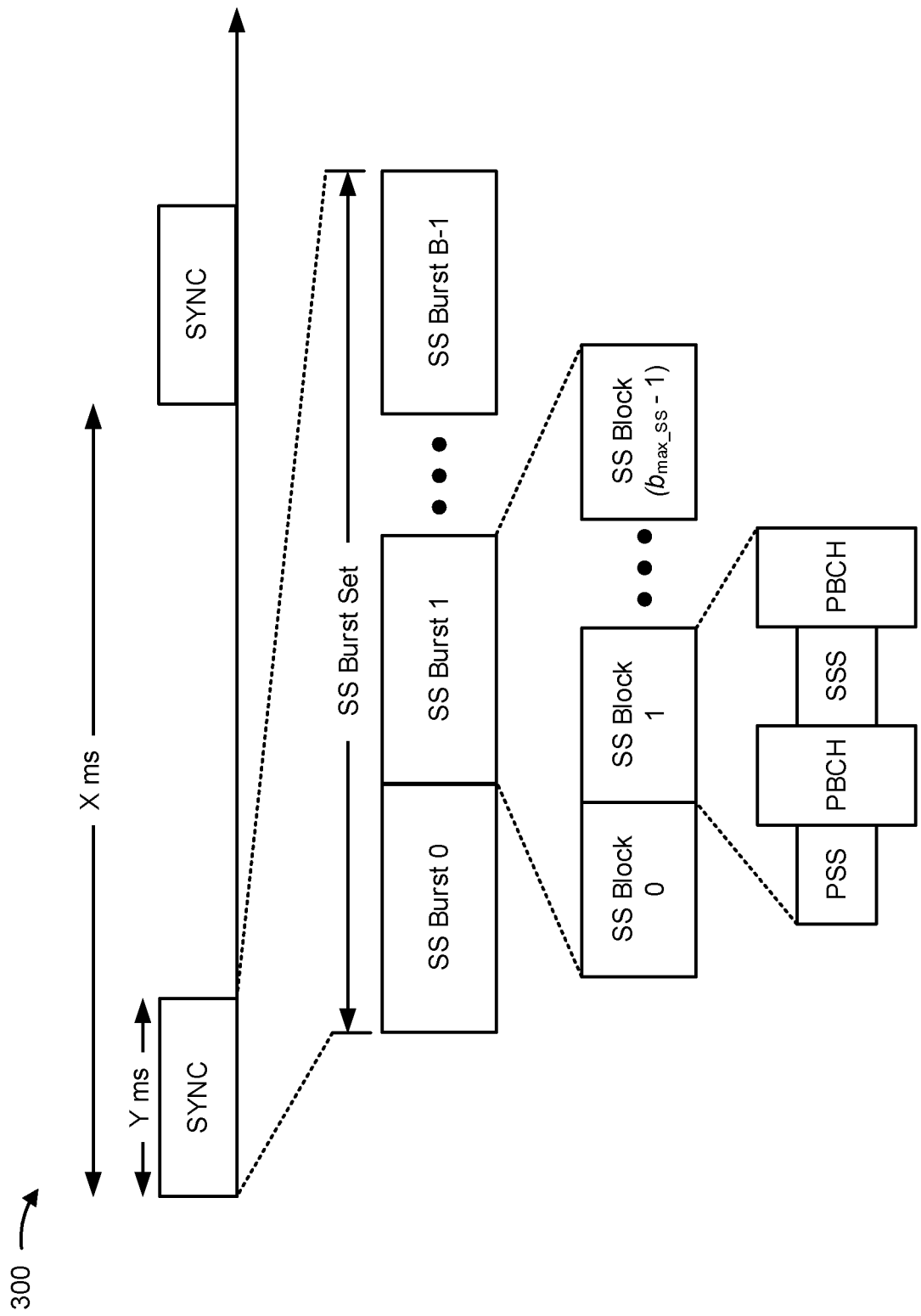
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_SS}-1$), where $b_{max\_SS}-1$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
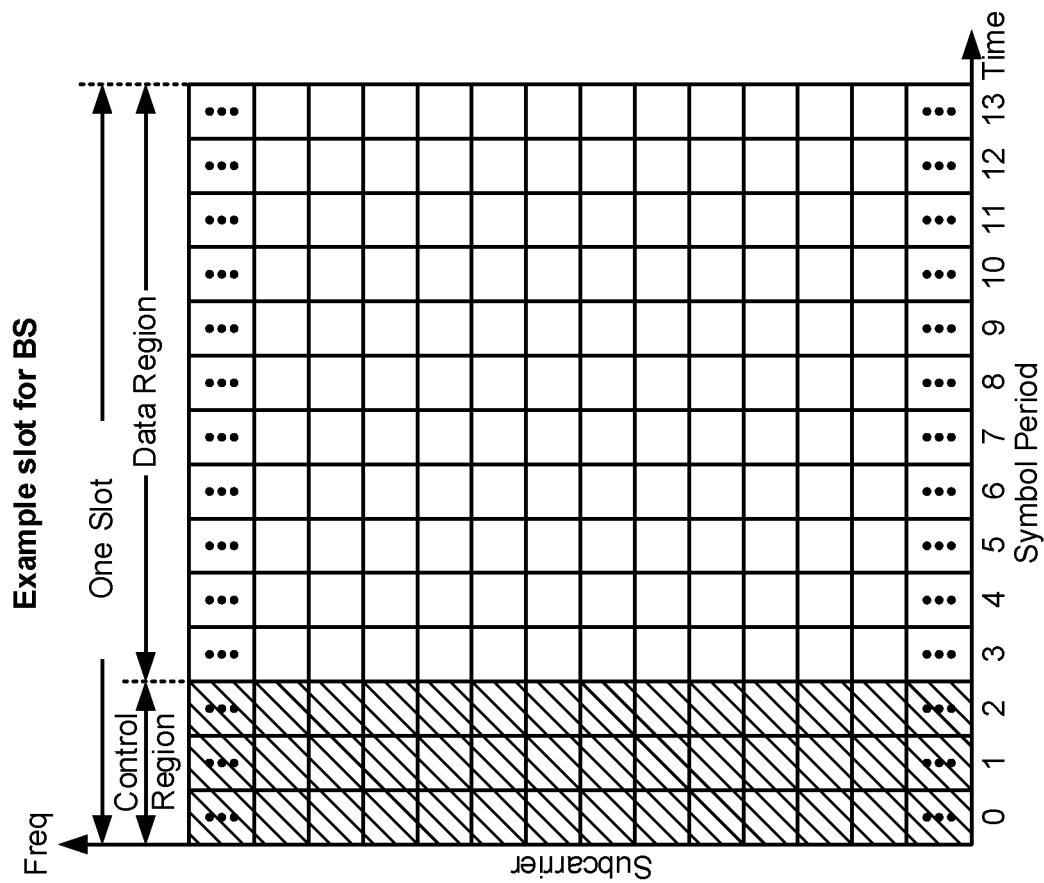
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-interference plus noise ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

In an NR network, a UE may operate in a connected state (e.g., a radio resource control (RRC) connected mode), an idle state (e.g., an RRC idle mode), or an inactive state (e.g., RRC inactive mode). When the UE is powered-on, the UE is in the idle state, and the UE can transition to the connected state (e.g., with an initial attachment to the network, with establishment of a network connection, and/or the like). If there is no activity from the UE for a threshold amount of time, the serving cell of the UE can suspend the UE session and trigger the UE to transition to the inactive state.

As part of the transition to the inactive state, both the UE and the network (e.g., a base station associated with the serving cell) store an access stratum (AS) context associated with the UE. The AS context includes, for example, a current RRC configuration, a current security context, a packet data convergence protocol (PDCP) state (including a robust header compression (ROHC) state), a service data adaptation protocol (SDAP) configuration, a cell radio network temporary identifier (C-RNTI) used in a primary cell, a cell identity, a physical cell identity of a primary cell, and/or the like. As described below, the storing of the AS context eliminates a need for such information to be re-provided to the UE when the UE transitions back to the connected state from the inactive state.

While in the inactive state, the UE handles mobility (e.g., such that the UE can be reselected to another serving cell while in the inactive state or can move to another serving cell while in the active state). Thus, the serving cell of the UE can change while the UE is in the inactive state.

The UE can detect a trigger, associated with resuming the session, when, for example, the UE needs to transmit an uplink transmission, when the UE detects a paging message for the UE, and/or the like. Here, the UE can trigger a resume procedure, associated with resuming the session, by sending a resume request (e.g., an RRC resume request) to the current serving cell of the UE. In a case in which the UE switches to (e.g., is reselected to, moves to, and/or the like) another serving cell while in the inactive mode, the resume request is transmitted using a serving cell common configuration associated with the new serving cell, which is read from a system information block (SIB) (e.g., SIB1) of the new serving cell as a result of the reselection to the new serving cell.

Next, the UE receives a resume message (e.g., an RRC resume message) associated with resuming the session, which triggers the UE to transition from the inactive state to the connected state. Based on this trigger, the UE restores the AS context using the AS context stored on the UE. Here, restoration of the AS context may reduce an amount of time needed to transition to the connected state and may reduce signaling overhead (e.g., as compared to transitioning to the connected state from the idle state) since information included in the AS context need not be re-provided by the network.

However, an issue arises in a case in which the UE has switched to another serving cell while in the inactive state (e.g., when the serving cell of the UE during the transition from the inactive state to the connected state is different from the serving cell of the UE when the UE stored the AS context). For example, as a result of restoring the AS context based on the AS context stored by the UE, the serving cell common configuration configured on the UE may be incorrect. As a particular example, assume that the UE is in the connected state and that cell A is the serving cell of the UE. Here, when the UE transitions to the inactive state, the AS context will include a serving cell common configuration for cell A. In this example, assume that the UE is reselected to cell B while in the inactive state (e.g., such that the serving cell of the UE is cell B rather than cell A). However, when the UE transitions from the inactive state back to the connected state, the UE will restore the stored AS context, meaning that the UE will be configured with the serving cell common configuration for cell A, even though the serving cell of the UE is cell B. In other words, the serving cell common configuration configured on the UE will be incorrect.

One technique to address this issue is to configure the serving cell to include a serving cell common configuration, associated with the serving cell, in the resume message that is received by the UE. In such a case, when the UE transitions from the inactive state back to the connected state, the UE will restore the AS context from the AS context stored by the UE, and will also apply the serving cell common configuration, received in the resume message, to the AS context. However, this technique is undesirable since the serving cell is required to send the serving cell common configuration, which increases overhead on the network and signaling overhead over the air interface.

Some aspects described herein provide techniques and apparatuses for common channel configuration in an NR inactive state. In some aspects, a UE may receive an RRC resume message, associated with transitioning the UE from an inactive state to a connected state and, based at least in part on receiving the RRC resume message, may be configured with a serving cell common configuration, associated with a serving cell of the UE, that is received in a SIB (e.g., SIB1) associated with the serving cell. Here, when the RRC resume message includes a serving cell common configuration, the UE is further configured with the serving cell common configuration included in the RRC resume message (e.g., such that the serving cell common configuration included in the RRC resume message overwrites the serving cell common configuration received in the SIB). Additional details are provided below.

Figure 5A:
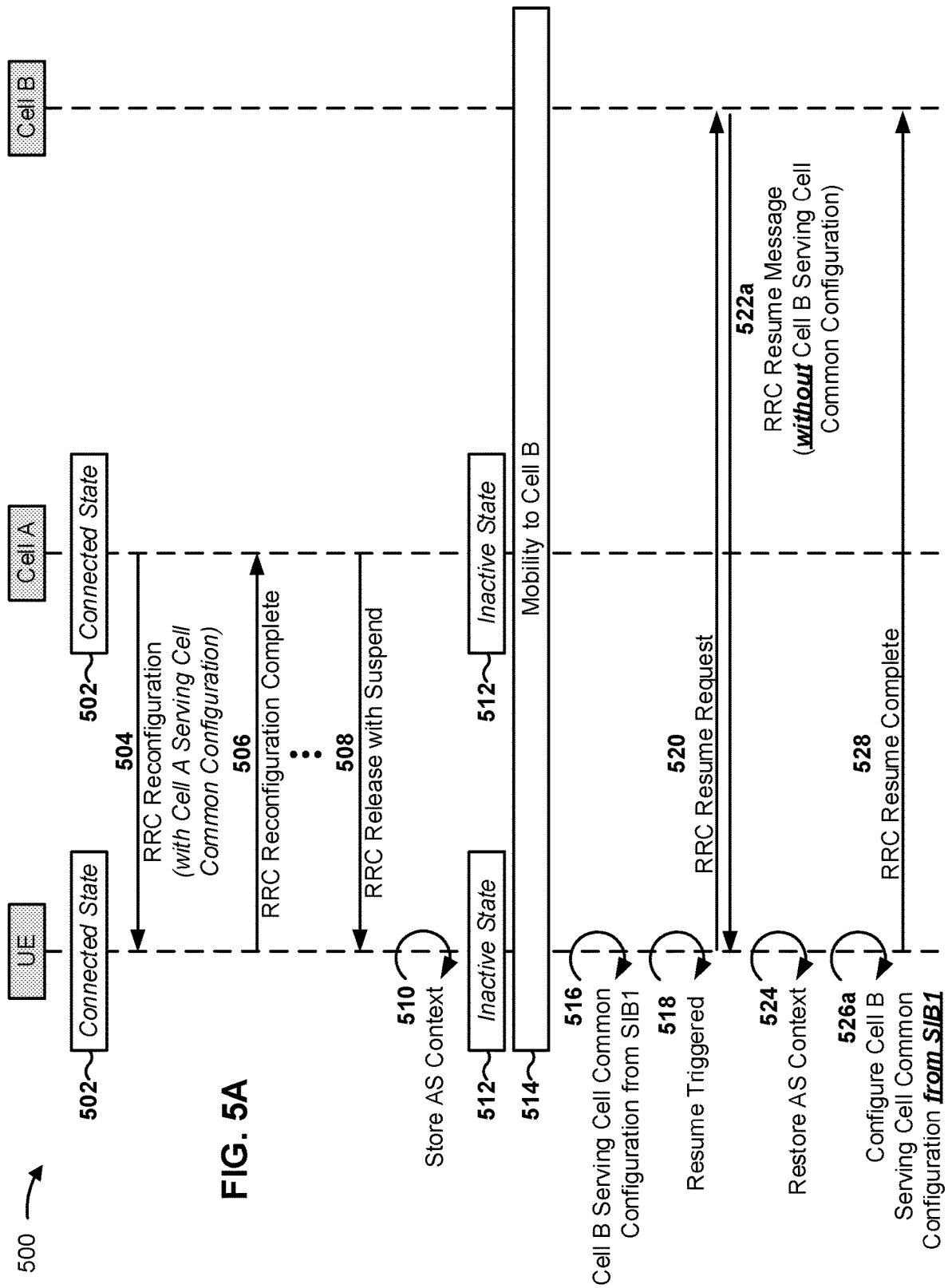
FIGS. 5A and 5B are diagrams illustrating examples of common channel configuration in New Radio (NR) inactive state, in accordance with various aspects of the present disclosure.
Figure 5B:
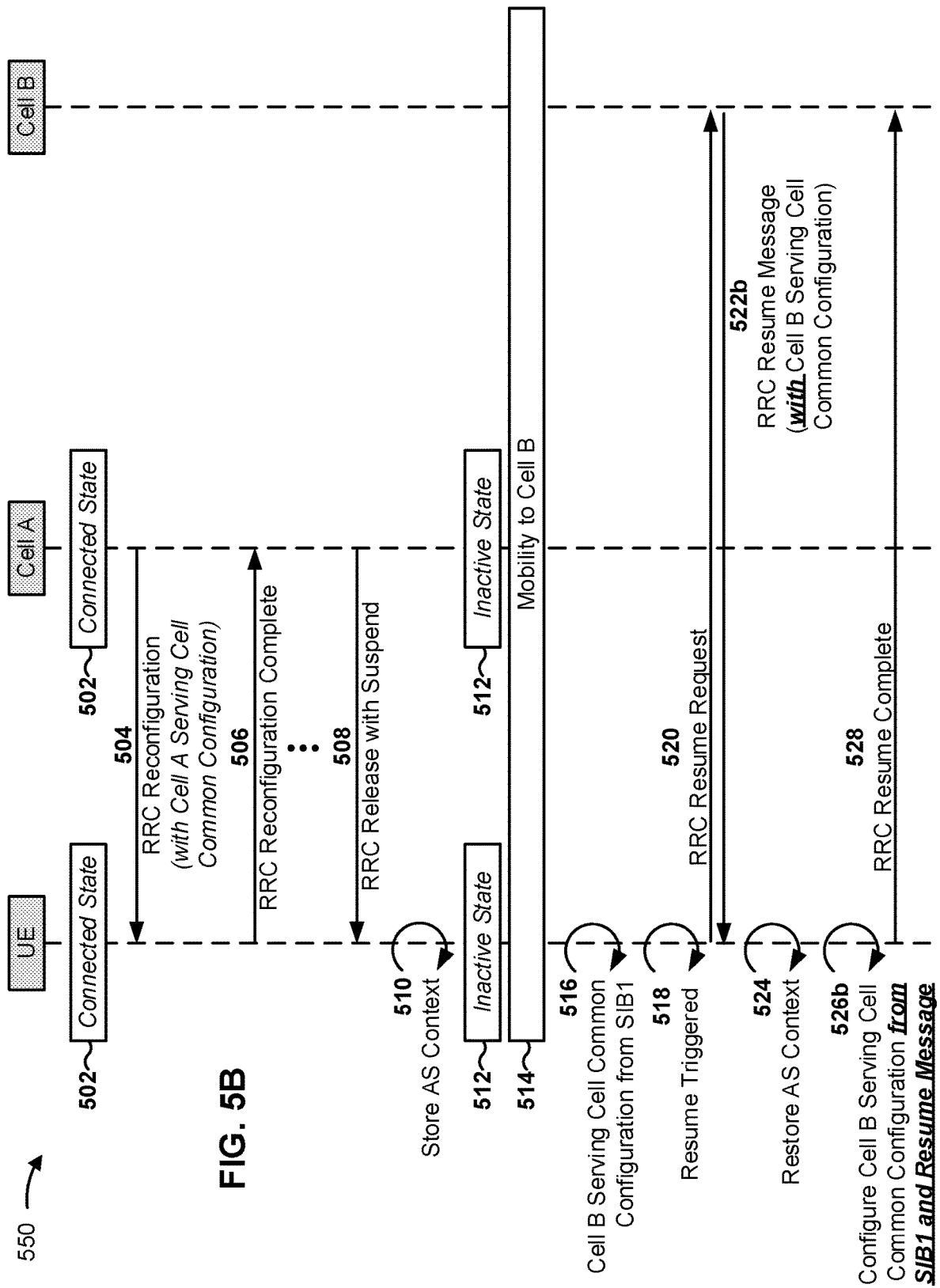

FIGS. 5A and 5B are diagrams illustrating examples 500 and 550, respectively, of common channel configuration in NR inactive state, in accordance with various aspects of the present disclosure. Example 500 is an example in which an RRC resume message, received by a UE that is to transition from an inactive state to a connected state, does not include a serving cell common configuration associated with a serving cell of the UE. Example 550 is an example in which an RRC resume message, received by a UE that is to transition from an inactive state to a connected state, includes a serving cell common configuration associated with a serving cell of the UE.

In example 500 of FIG. 5A, and as shown by reference number 502, a UE (e.g., UE 120) may be in a connected state in cell A (e.g., a serving cell associated with a base station 110). As shown by reference number 504, the UE may be configured, via an RRC reconfiguration message provided by cell A, with a serving cell common configuration associated with cell A. As shown by reference number 506, in connection with the reconfiguration message, the UE may provide, to cell A, an RRC reconfiguration complete message. At this point, the UE is operating in the connected state and the UE may communicate with cell A via the established RRC connection.

As shown by reference number 508, the UE may receive an RRC release message indicating that the UE session, associated with cell A, is to be suspended, which triggers the UE to transition from the connected state to an inactive state. In some aspects, the UE may receive such an RRC release message when, for example, cell A does not detect activity from the UE for a threshold amount of time. As shown by reference number 510, the UE (and cell A) may store an AS context associated with the UE and, as shown by reference number 512, the UE may transition to the inactive state.

Next, as indicated by reference number 514, mobility of the UE causes the UE to switch to cell B while the UE is in the inactive state (e.g., such that the serving cell of the UE switches from cell A to cell B). For example, the UE may be reselected to cell B while the UE is in the inactive state. As another example, the UE may switch to cell B when the UE leaves an area covered by cell A and/or enters an area covered by cell B. As shown by reference number 516, as a result of the switch to cell B, the UE may be configured with a serving cell common configuration, associated with cell B, from a SIB (e.g., SIB1) associated with cell B.

As shown by reference number 518, after the UE switches to cell B while in the inactive state, the UE may detect a trigger, associated with resuming the session (e.g., when the UE needs to transmit an uplink transmission, when the UE detects a paging message for the UE, and/or the like). As shown by reference number 520, the UE can trigger a resume procedure, associated with resuming the session, by sending an RRC resume request to cell B (e.g., the current serving cell of the UE).

As shown by reference number 522a of FIG. 5A, the UE may receive, from cell B, an RRC resume message, associated with resuming the session, which triggers the UE to transition from the inactive state to the connected state. Notably, in example 500, the RRC resume message does not include a serving cell common configuration associated with cell B.

As shown by reference number 524, based at least in part on receiving the RRC resume message, the UE restores the AS context (e.g., as previously stored by the UE). Additionally, as shown by reference number 526a, a serving cell common configuration, associated with cell B, is configured on the UE. As indicated, the serving cell common configuration configured at reference number 526a is the serving cell common configuration received from the SIB associated with cell B (i.e., the serving cell common configuration received in association with reference number 516). Here, the serving cell common configuration of cell B will be used by the UE (rather than the serving cell common configuration associated with cell A, which would be configured when the UE restored the AS context). In some aspects, the UE may overwrite the serving cell common configuration restored form the AS context with the serving cell common configuration received in the SIB associated with cell B.

As shown by reference number 528, after configuration of the serving cell common configuration using the serving cell common configuration received in the SIB associated with cell B, the UE may provide an RRC complete message, and may transition to the connected state.

In example 550 of FIG. 5B, operations associated with reference numbers 502 through 520 are similar to those described in association with example 500 FIG. 5A. However, as shown by reference number 522b of FIG. 5B, the UE may receive, from cell B, an RRC resume message, associated with resuming the session, which triggers the UE to transition from the inactive state to the connected state. Notably, in example 550, the RRC resume message includes a serving cell common configuration associated with cell B.

As shown by reference number 524, and similar to as described above, the UE restores the AS context (e.g., as previously stored by the UE). Additionally, as shown by reference number 526b, a serving cell common configuration, associated with cell B, is configured on the UE. As indicated, by reference number 526b, the UE may be configured based at least in part on both the serving cell common configuration received from the SIB associated with cell B and the serving cell common configuration included in the RRC resume message. As a result, the serving cell common configuration of cell B will be used by the UE (rather than the serving cell common configuration associated with cell A, which would be configured when the UE restored the AS context). In some aspects, the UE may overwrite the serving cell common configuration restored from the AS context with the serving cell common configuration received in the SIB associated with cell B, and may at least partially overwrite the serving cell common configuration received in the SIB with the serving cell common configuration included in the RRC resume message.

As shown by reference number 528, after configuration of the serving cell common configuration using the serving cell common configuration received in the SIB and the serving cell common configuration included in the RRC resume message, the UE may provide an RRC complete message, and may transition to the connected state.

In this way, the serving cell common configuration configured on the UE when the UE transitions from the inactive state to the connected state is updated (e.g., such that the serving cell common configuration is associated with a current serving cell of the UE), without requiring additional signaling overhead (e.g., since cell B need not provide the serving cell common configuration).

As indicated above, FIGS. 5A and 5B are provided as examples. Other examples may differ from what is described with respect to FIGS. 5A and 5B.

Figure 6:
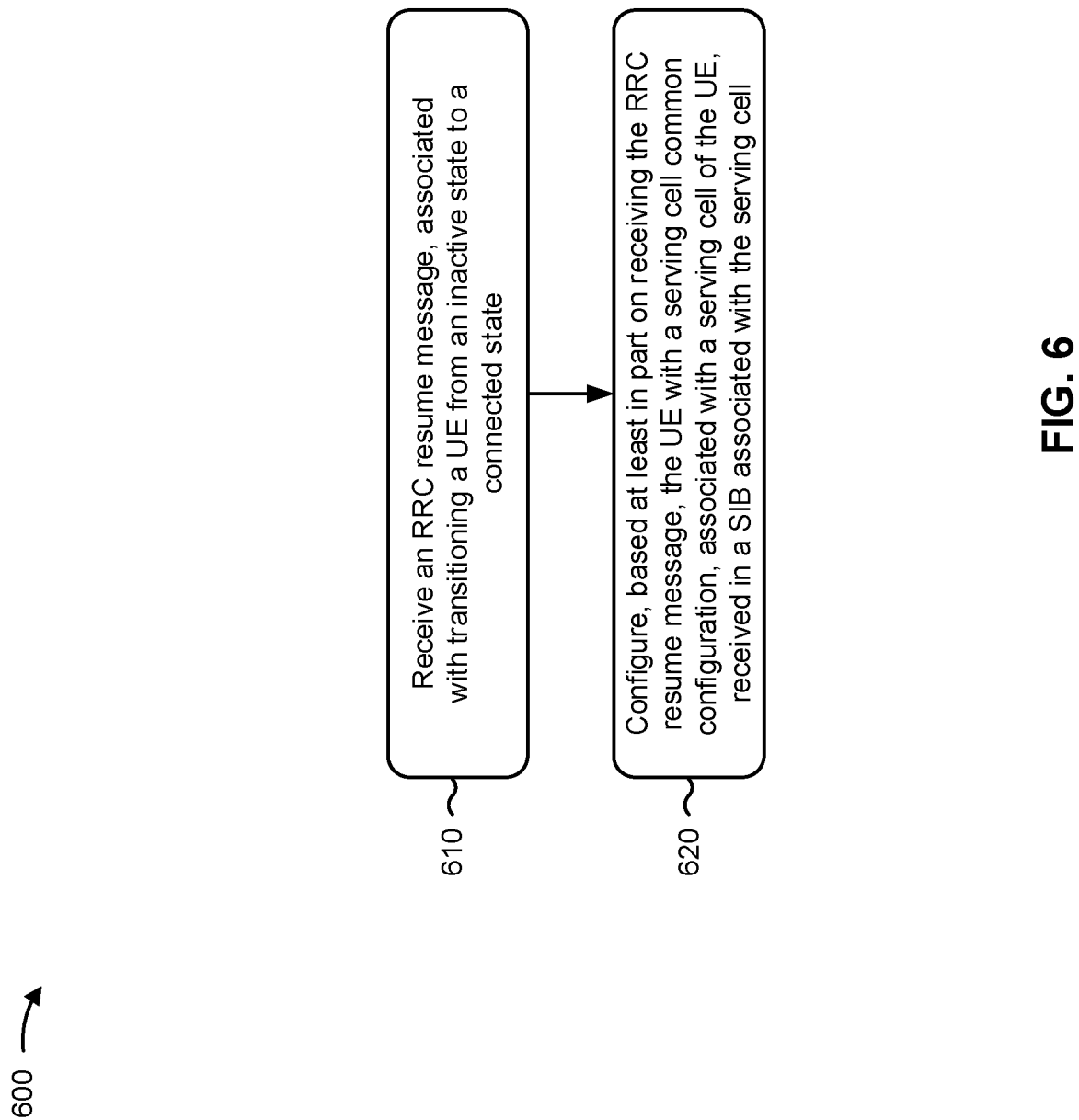
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120) performs common channel configuration in NR inactive state.

As shown in FIG. 6, in some aspects, process 600 may include receiving a RRC resume message, associated with transitioning the UE from an inactive state to a connected state (block 610). For example, the UE (e.g., using antenna 252, DEMOD 254, MIMO detector 256, receive processor 258, controller/processor 280, and/or the like) may receive a RRC resume message, associated with transitioning the UE from an inactive state to a connected state, as described above.

As shown in FIG. 6, in some aspects, process 600 may include configuring, based at least in part on receiving the RRC resume message, the UE with a serving cell common configuration, associated with a serving cell of the UE, received in a SIB associated with the serving cell (block 620). For example, the UE (e.g., using antenna 252, DEMOD 254, MIMO detector 256, receive processor 258, controller/processor 280, and/or the like) may configure, based at least in part on receiving the RRC resume message, the UE with a serving cell common configuration, associated with a serving cell of the UE, received in a SIB associated with the serving cell, as described above.

Process 600 may include additional aspects, such as any single aspect and/or any combination of aspects described below and/or in connection with one or more other processes described elsewhere herein.

In a first aspect, when the RRC resume message includes a serving cell common configuration, the UE is further configured with the serving cell common configuration included in the RRC resume message. Here, the serving cell common configuration included in the RRC resume message overwrites the serving cell common configuration received in the SIB.

In a second aspect, alone or in combination with the first aspect, the RRC resume message does not include a serving cell common configuration.

In a third aspect, alone or in combination with any one or more of the first and second aspects, the UE is further configured based at least in part on an access stratum (AS) context stored on the UE before entering the inactive state.

In a fourth aspect, alone or in combination with any one or more of the first through third aspects, the UE is configured with the serving cell common configuration received in the SIB instead of being configured with a serving cell common configuration included in the AS context. That is, in the fourth aspect, the UE is configured with the serving cell common configuration received in the SIB instead of using a serving cell common configuration from a serving cell of the UE when the UE entered the inactive state In a fifth aspect, alone or in combination with any one or more of the first through fourth aspects, the SIB, associated with the serving cell, is received based at least in part on UE mobility that causes the UE to be served by the serving cell while the UE is in the inactive state.

In a sixth aspect, alone or in combination with any one or more of the first through fifth aspects, the SIB, associated with the serving cell, is SIB1 associated with the serving cell.

In a seventh aspect, alone or in combination with any one or more of the first through sixth aspects, the RRC resume message is received in connection with a RRC resume request being provided. Here, the RRC resume request is provided based at least in part on detection of a trigger to transition the UE from the inactive state to the connected state.

In an eighth aspect, alone or in combination with any one or more of the first through seventh aspects, the UE transitions to the connected state from the inactive state after configuration of the UE with the serving cell common configuration received in the SIB.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    obtaining an access stratum (AS) context comprising a first serving cell common configuration associated with a first cell while the UE is in a connected state;
    receiving a system information block (SIB) associated with a second cell in connection with the UE switching to the second cell,
    the SIB including a second serving cell common configuration for the second cell;
    receiving a radio resource control (RRC) resume message, associated with transitioning the UE from an inactive state to the connected state, separately from receiving the SIB; and
    configuring, based at least in part on receiving the RRC resume message, the UE with the second serving cell common configuration received in the SIB.

2. The method of claim 1, wherein, when the RRC resume message includes a third serving cell common configuration, the UE is further configured with the third serving cell common configuration included in the RRC resume message,
    wherein the third serving cell common configuration included in the RRC resume message overwrites the second serving cell common configuration received in the SIB.

3. The method of claim 1, wherein the RRC resume message does not include a serving cell common configuration.

4. The method of claim 1, wherein the UE is further configured based at least in part on the AS context obtained by the UE before entering the inactive state.

5. The method of claim 1, wherein the UE is configured with the second serving cell common configuration received in the SIB instead of using the first serving cell common configuration obtained from the first cell.

6. The method of claim 1, wherein the SIB, associated with the second cell, is received based at least in part on UE mobility that causes the UE to reselect to the second cell.

7. The method of claim 1, wherein the SIB, associated with the second cell, is SIB1 associated with the second cell.

8. The method of claim 1, wherein the RRC resume message is received in connection with a RRC resume request being sent by the UE,
    wherein the RRC resume request is sent by the UE based at least in part on detection of a trigger to transition the UE from the inactive state to the connected state.

9. The method of claim 1, wherein the UE transitions to the connected state from the inactive state after configuration of the UE with the second serving cell common configuration received in the SIB.

10. A user equipment (UE) for wireless communication, comprising:
    a memory; and
    one or more processors coupled to the memory, the memory and the one or more processors configured to:

obtain an access stratum (AS) context comprising a first serving cell common configuration associated with a first cell while the UE is in a connected state;

receive a system information block (SIB) associated with a second cell in connection with the UE switching to the second cell,
the SIB including a second serving cell common configuration for the second cell;

receive a radio resource control (RRC) resume message, associated with transitioning the UE from an inactive state to the connected state, separately from receiving the SIB; and configure, based at least in part on receiving the RRC resume message, the UE with the second serving cell common configuration received in the SIB.

11. The UE of claim 10, wherein, when the RRC resume message includes a third serving cell common configuration, the UE is further configured with the third serving cell common configuration included in the RRC resume message,
wherein the third serving cell common configuration included in the RRC resume message overwrites the second serving cell common configuration received in the SIB.

12. The UE of claim 10, wherein the RRC resume message does not include a serving cell common configuration.

13. The UE of claim 10, wherein the UE is further configured based at least in part on the AS context obtained by the UE before entering the inactive state.

14. The UE of claim 10, wherein the UE is configured with the second serving cell common configuration received in the SIB instead of using the first serving cell common configuration obtained from the first cell.

15. The UE of claim 10, wherein the SIB, associated with the second cell, is received based at least in part on UE mobility that causes the UE to reselect to the second cell.

16. The UE of claim 10, wherein the SIB, associated with the second cell, is SIB1 associated with the second cell.

17. The UE of claim 10, wherein the RRC resume message is received in connection with a RRC resume request being sent by the UE,
wherein the RRC resume request is sent by the UE based at least in part on detection of a trigger to transition the UE from the inactive state to the connected state.

18. The UE of claim 10, wherein the UE transitions to the connected state from the inactive state after configuration of the UE with the second serving cell common configuration received in the SIB.

19. A non-transitory computer-readable medium storing one or more instructions for wireless communication, the one or more instructions comprising:
one or more instructions that, when executed by one or more processors of a user equipment (UE), cause the one or more processors to:
obtain an access stratum (AS) context comprising a first serving cell common configuration associated with a first cell while the UE is in a connected state;
receive a system information block (SIB) associated with a second cell in connection with the UE switching to the second cell,
the SIB including a second serving cell common configuration for the second cell;
receive a radio resource control (RRC) resume message, associated with transitioning the UE from an inactive state to the connected state, separately from receiving the SIB; and
configure, based at least in part on receiving the RRC resume message, the UE with the second serving cell common configuration received in the SIB.

20. The non-transitory computer-readable medium of claim 19, wherein, when the RRC resume message includes a third serving cell common configuration, the UE is further configured with the third serving cell common configuration included in the RRC resume message,
wherein the third serving cell common configuration included in the RRC resume message overwrites the second serving cell common configuration received in the SIB.

21. The non-transitory computer-readable medium of claim 19, wherein the RRC resume message does not include a serving cell common configuration.

22. The non-transitory computer-readable medium of claim 19, wherein the UE is further configured based at least in part on the AS context obtained by the UE before entering the inactive state.

23. The non-transitory computer-readable medium of claim 19, wherein the UE is configured with the second serving cell common configuration received in the SIB instead of using the first serving cell common configuration obtained from the first cell.

24. The non-transitory computer-readable medium of claim 19, wherein the SIB, associated with the second cell, is received based at least in part on UE mobility that causes the UE to reselect to the second cell.

25. The non-transitory computer-readable medium of claim 19, wherein the SIB, associated with the second cell, is SIB1 associated with the second cell.

26. The non-transitory computer-readable medium of claim 19, wherein the RRC resume message is received in connection with a RRC resume request being sent by the UE,
wherein the RRC resume request is sent by the UE based at least in part on detection of a trigger to transition the UE from the inactive state to the connected state.

27. The non-transitory computer-readable medium of claim 19, wherein the UE transitions to the connected state from the inactive state after configuration of the UE with the second serving cell common configuration received in the SIB.

28. An apparatus for wireless communication, comprising:
means for obtaining an access stratum (AS) context comprising a first serving cell common configuration associated with a first cell while the apparatus is in a connected state;
means for receiving a system information block (SIB) associated with a second cell in connection with the apparatus switching to the second cell,
the SIB including a second serving cell common configuration for the second cell; means for receiving a radio resource control (RRC) resume message, associated with transitioning the apparatus from an inactive state to the connected state, separately from receiving the SIB; and
means for configuring, based at least in part on receiving the RRC resume message, the apparatus with the second serving cell common configuration received in the SIB.

29. The apparatus of claim 28, wherein the RRC resume message does not include a serving cell common configuration.

30. The apparatus of claim 28, wherein the apparatus is configured with the second serving cell common configuration received in the SIB instead of being configured with the first serving cell common configuration included in the AS context obtained by the apparatus before entering the inactive state.

\* \* \* \* \*